United States Patent [19]
Finck

[11] 3,976,239
[45] Aug. 24, 1976

[54] PROCESS FOR RECONDITIONING WORN FROGS

[75] Inventor: Herbert Finck, Witten-Bommern, Germany

[73] Assignee: Elektro-Thermit GmbH, Germany

[22] Filed: Aug. 12, 1975

[21] Appl. No.: 603,972

Related U.S. Application Data

[63] Continuation of Ser. No. 475,966, June 3, 1974, abandoned.

[30] Foreign Application Priority Data

June 27, 1973 Germany............................ 2332646

[52] U.S. Cl................................. 228/119; 29/401 D
[51] Int. Cl.²........................................ B22D 19/10
[58] Field of Search .......... 29/401, 413, 414, 527.5, 29/527.6; 228/119, 191, 241; 104/15; 246/468; 164/92, DIG. 12

[56] References Cited
UNITED STATES PATENTS

| | | | |
|---|---|---|---|
| 1,168,061 | 1/1916 | Deppeler | 104/15 X |
| 1,562,227 | 11/1925 | Goldschmidt | 164/DIG. 12 |
| 1,933,139 | 10/1933 | Daley | 29/401 |
| 2,174,367 | 9/1939 | Hoffman | 246/468 |
| 3,620,291 | 11/1971 | Delachapelle | 164/DIG. 12 |
| 3,623,207 | 11/1971 | Zoso | 104/15 X |
| 3,708,856 | 1/1973 | Keifer | 29/401 |
| 3,764,802 | 10/1973 | Webster | 246/468 |
| 3,821,840 | 7/1974 | Kershaw | 29/401 |

Primary Examiner—James L. Jones, Jr.
Assistant Examiner—Nicholas P. Godici
Attorney, Agent, or Firm—James E. Bryan

[57] ABSTRACT

This invention relates to an improvement in the process for reconditioning worn frogs of railway switches by severing the frog together with sections of the regulating rails adjacent thereto, reconditioning the frog, and renewed welding-in of the frog block, the improvement comprising severing the worn frog from the junction regulating rails at connecting welds thereof, reconditioning the frog, and welding two new regulating rails onto the reconditioned frog, with compensation for the loss in length, due to the severing operation, simultaneously in one casting by aluminothermic welding.

3 Claims, 1 Drawing Figure

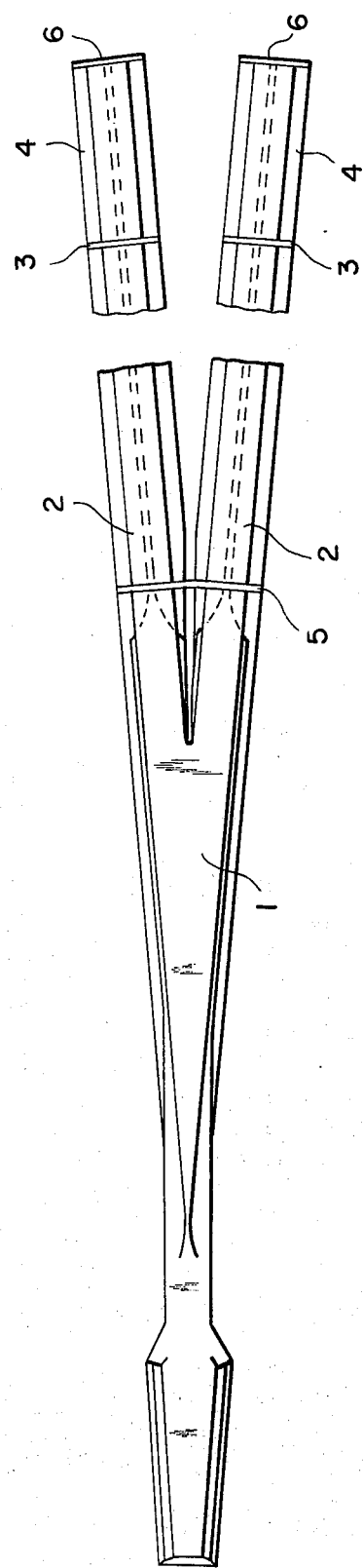

PROCESS FOR RECONDITIONING WORN FROGS

This is a continuation, of application Ser. No. 475,966, filed June 3, 1974, now abandoned.

The present invention relates to a process for reconditioning worn frogs of railway switches by separating the frog together with sections of the regulating rails adjacent thereto, reconditioning the frog, and renewed welding-in of the frog block.

At the time of the new fabrication of a frog block, one half each of the frog proper (the filled section rail) is connected with a regulating rail, having a specific length, by means of flash welding operations. Both halves are then joined together by joint welding to form the frog proper and produce, together with the regulating rails, the frog block ready for installation.

Due to the strong mechanical stress exerted on the frog point, it is necessary to recondition the frog after a certain period of time, which may be accomplished, for example, by building-up by welding.

According to the state of the art, the frog together with a short section of the adjacent regulating rails is separated from the track. Once the reconditioning of the frog is completed, however, the frog no longer has the prescribed structural length due to its having been removed from the tracks. This change in length has been rectified heretofore by welding a regulating rail end having a length of approximately 300 millimeters onto the regulating rails by the flash welding process, and by subsequent cutting to the correct length. This welding-on of the regulating rail ends having a length of approximately 300 millimeters is required because of the clamping device of the welding machine.

When a frog, reconditioned according to the state of the art, is installed once again in the track, there will be three welding seams over a length of 2 to 4 meters so that, as a result, due to the increase in the traveling speed, the reconditioned frogs are permitted to be used again only in thirdclass tracks.

The present invention is based on the goal of finding a process for the reconditioning and renewed installation of frogs which renders the third welding for purposes of re-establishing the original regulating length superfluous, so that the reconditioned frogs then may be employed also in tracks of a higher class.

This object is obtained, according to the present invention, in that the worn frog is separated from the junction, or connecting regulating rails, at the connecting welds thereof, the frog then is reconditioned in a manner known per se, and thereafter two new regulating rails are welded onto the reconditioned frog, while compensating for the loss in length, which has occurred during the disassembly, simultaneously in one casting by means of aluminothermic welding.

That this inventively proposed solution was not known to those skilled in the art results from the fact that, despite the known difficulties and although the aluminothermic rail welding process has been known and performed for decades, it has not yet been employed heretofore in re-installing or reconditioned frogs. It is, however, specifically the aluminothermic rail welding process which, by welding-on new regulating rails in one casting and by dimensioning the gap between the rail ends to be welded together, makes possible a length compensation of up to approximately 24 millimeters, which is sufficient for obtaining the regulating length of the frog point even after the shortening due to the preceding removal thereof.

The frog block which, after the reconditioning operation, is again welded into the track according to the present invention has only two welds rather than three, and these two welds are positioned at distances with respect to each other that are permissible from the standpoint of operational techniques since the weld previously positioned in the center in each case is now eliminated. In this manner it is possible to employ frogs reconditioned according to the present invention also in tracks of a higher class. The present process therefore is highly economical.

The prior art process and, as a comparison, the inventive process will be further described hereinafter with reference to the accompanying drawing, which illustrates a frog.

In the prior art process, the frog 1 is severed in the zone of the adjacent regulating rails 2 at the points 3. This is done, for example, by autogenous cutting, at which time a loss in length will occur due to the cutting of the rail material. The reconditioned frog point 1 cannot be installed again in the resulting cut length it now has since it does not have the prescribed structural length. For this reason, regulating rail ends 4 having a length of approximately 300 millimeters must be welded onto the ends of the regulating rails 2 and thereafter cut to the correct length. This frog block is then installed in the track at the points 6.

In the process according to the present invention, the separating operation is effected not in the zone 3, but rather at the welds 5 formed when the frog point is made. After reconditioning the frog point 1, the two regulating rails 2 are welded in this zone or area 5 aluminothermically and simultaneously in one casting, while a compensation of the length is effected by dimensioning a corresponding gap which is filled with aluminothermically-produced steel. Hence the welds 3 become superfluous.

Employed for welding are corresponding molds which permit the simultaneous welding-on of the two new regulating rails in one casting, and use is expediently made of casting molds made elsewhere according to the $CO_2$ process. In the case of steep frogs, for example in a ratio of 190 – 1 : 9, a double mold with a riser in the center between the mold halves and, in the case of narrow frogs, for example in a ratio of 500 – 1 : 12, a mold with an inserted sand core between the regulating rails is expediently employed.

In the case of the aforementioned narrow frogs, it has been found to be particularly favorable to additionally weld the rail feet together with each other and, if desired, also the rail heads of the two regulating rails by insertion of a core, whereby a stiffening or reinforcement of the entire frog block is effectively achieved.

It will be obvious to those skilled in the art that many modifications may be made within the scope of the present invention without departing from the spirit thereof, and the invention includes all such modifications.

What is claimed is:

1. In the process for restoring the prescribed length of a worn frog of a railway switch by severing the frog together with sections of the regulating rails adjacent thereto, reconditioning the frog, and renewed welding-in of the frog block,
  the improvement which comprises severing the worn frog from the junction regulating rails at connecting welds thereof,
  reconditioning the frog, and welding two new regulating rails onto the reconditioned frog, with compensation for the loss in length, due to the severing operation, simultaneously in one casting by aluminothermic welding.

2. A process according to claim 1 including, during the aluminothermic welding of narrow frogs, welding together the inwardly-positioned areas of the rail feet.

3. A process according to claim 2 including welding together the inwardly-positioned areas of the rail heads.

* * * * *